(No Model.)
W. A. HAMMOND & R. W. TAYLOR.
TOMBSTONE OR MONUMENT.
No. 581,156. Patented Apr. 20, 1897.
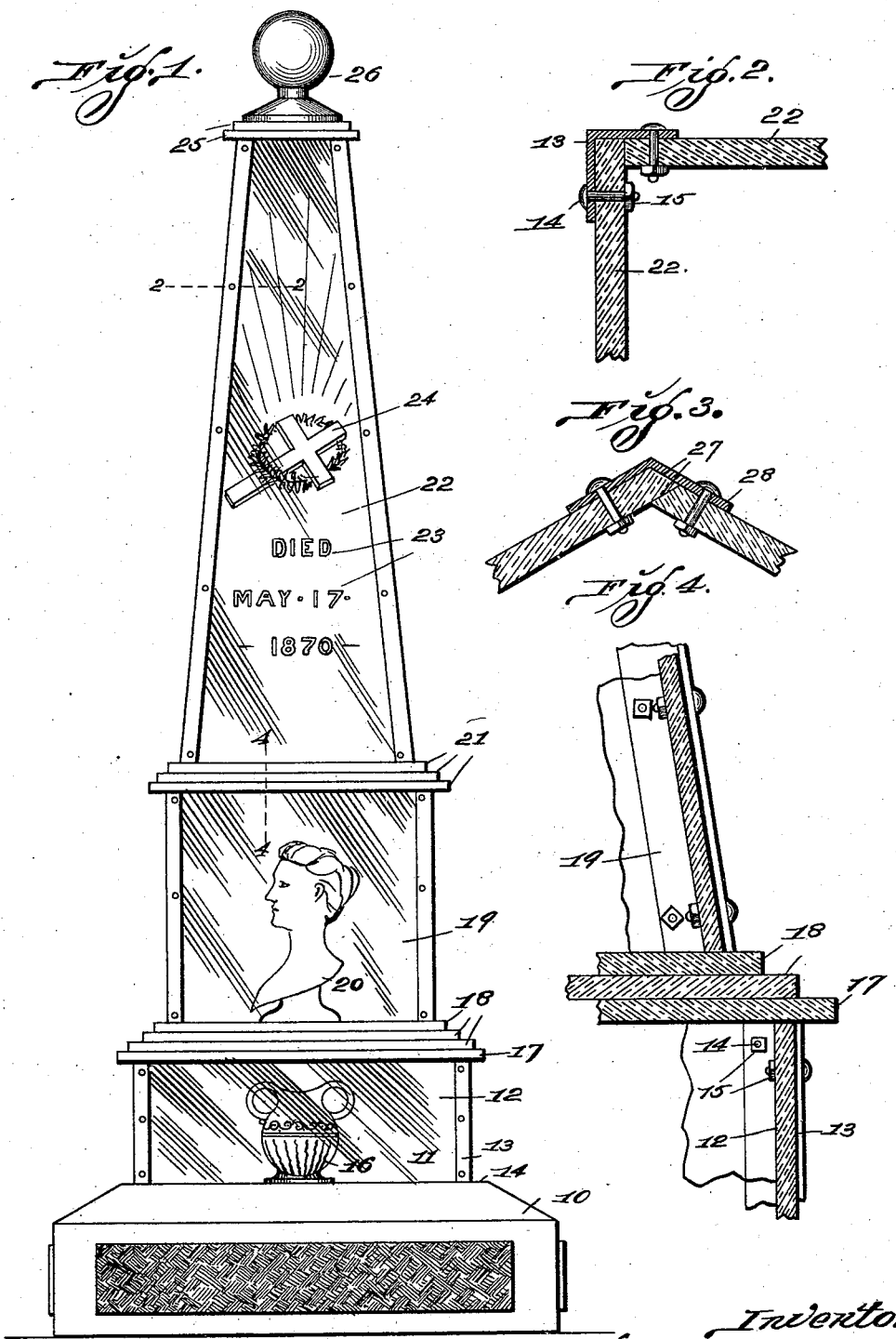
Attest
M. Smith.
S. G. Wells.
Inventors
W. A. Hammond and
R. W. Taylor:—
By Higdon, Longan & Higdon
Atty's.

UNITED STATES PATENT OFFICE.

WILLIAM ALBERT HAMMOND AND ROBERT WILLIAM TAYLOR, OF ST. LOUIS, MISSOURI.

TOMBSTONE OR MONUMENT.

SPECIFICATION forming part of Letters Patent No. 581,156, dated April 20, 1897.

Application filed September 21, 1896. Serial No. 606,495. (No model.)

*To all whom it may concern:*

Be it known that we, WILLIAM ALBERT HAMMOND and ROBERT WILLIAM TAYLOR, of the city of St. Louis, State of Missouri, have invented certain new and useful Improvements in Tombstones or Monuments, of which the following is a full, clear, and exact description, reference being had to the accompanying drawings, forming a part hereof.

Our invention relates to tombstones and monuments; and it consists in the novel construction, combination, and arrangement of parts hereinafter shown, described, and claimed.

Figure 1 is a view in elevation of a tombstone or monument constructed in accordance with the principles of our invention. Fig. 2 is a horizontal sectional view on the line 2 2 of Fig. 1, parts being broken away to economize space. Fig. 3 is a horizontal sectional view showing a modified form of the parts shown in Fig. 2. Fig. 4 is an enlarged detail vertical sectional view taken approximately on the indicated line 4 4 of Fig. 1, parts being broken away to economize space.

In the construction of our improved tombstones or monuments we employ the base 10, which may be a block of granite or suitable masonry and may be ornamented as desired. The portion 11, which rests upon the base 10, consists of four of the pieces 12 of crystal plate-glass, which may be of the desired size and thickness and which are arranged in the form of a square or rectangle, with the edges of the glass resting upon or embedded in the upper surface of the base 10. The meeting edges of the plates 12 are joined together, as shown in Fig. 2. The inner face of one plate engages the edge of the next adjacent plate. The angle-bars 13 are placed around the corners formed by the plates and are held in position by the bolts 14, which pass through the edges of said angle-bars and through the plates and are held in position by the nuts 15 upon the inner ends of said bolts. The angle-bars 13 may be nickeled, galvanized, polished, or ornamented in any desired manner, and when placed in position, as shown in Fig. 2, will hold the plates securely together.

An urn, such as 16, or any other suitable device may be placed within the walls of the portion 11 and upon the upper face of the base 10. The piece 17 of glass is placed upon the portion 11 and rests upon the upper edges of the plates 12 and the upper ends of the angle-bars 13, and the edges of said plate 17 may extend outside of the portion 11 to any desired extent. The plates 18, similar in every respect to the plate 17, are placed one above the other upon the plate 17. The first one of the plates 18 above the plate 17 is somewhat smaller than the plate 17, and the second one is still smaller than the first one, and as many plates may be used as desired.

The portion 19 of the tombstone or monument is similar in every respect to the portion 11, but it may be of a different shape or size. The said portion 19 rests upon the upper one of the plates 18. The bust 20 or other suitable device may be placed within the walls of the portion 19 and upon the upper surface of the plate 18.

The glass plates 21 are placed on top of the portion 19 and are similar in every respect to the plates 17 and 18. The portion 22 of the tombstone or monument is identical in construction with the portions 11 and 19, with the exception that it is smaller in plan and larger in elevation, and the glass plates of which it is composed are wider at the bottom than at the top. Suitable inscription, such as 23, and emblematic designs, such as 24, may be painted upon the inner faces of the plates composing either or all of the portions 11, 19, and 22. The portion 22 is surrounded by the glass plates 25, which are similar to the plates 17, 18, and 21, and the top piece 26, which may be of any suitable design or material, rests upon the upper face of the upper one of the plates 25. A tombstone or monument constructed in accordance with the principles of our invention may have any desired number of sides, but four or six sides are preferable.

When it is desired to construct a six-sided monument or tombstone, the corners are made as shown in Fig. 3. The edges 27 of the plates are beveled, so as to form a tight joint with each other, and the angle-bars 28 are made to fit the corners thus formed, and said angle-bars are bolted to the plates, as heretofore described.

When properly constructed in accordance with the principles of our invention as herein set forth, the tombstone or monument is very attractive in appearance and is practically indestructible.

In the construction shown in Figs. 1, 2, 3, and 4 the lower edges of the plates 12 may be cemented to the base 10 and the upper edges of said plates may be cemented to the plate 17, the plates 17 and 18 may be cemented together, the lower edges of the plates 19 may be cemented to the upper surface of the upper plate 18, the upper edges of the plates 19 may be cemented to the lower surface of the lower plate 21, the plates 21 may be cemented together, the lower edges of the plates 22 may be cemented to the upper surface of the upper plate 21 and the upper edges of the plates 22 may be cemented to the lower surface of the lower plate 25, the plates 25 may be cemented together, and the top piece 26 may be cemented to the upper surface of the upper plate 25, or the plates may be placed in position without cement, according to the circumstances and conditions under which the monument or tombstone is built.

We claim—

1. In a tombstone or monument, a suitable base, vertical plates of glass resting on edge upon said base and placed end to end at angles relative to each other, bars of angle-iron forming connections between the meeting ends of said plates of glass, plates of glass placed in a horizontal position and resting upon the upper edges of the first-mentioned plates of glass, vertical plates of glass mounted upon said horizontal plates and placed end to end at angles relative to each other, and bars of angle-iron forming connections between the meeting ends of said last-mentioned vertical plates of glass, substantially as specified.

2. In a tombstone or monument, a suitable base, vertical plates of glass resting upon said base and placed end to end at angles relative to each other, bars of angle-iron forming connections between the meeting ends of said plates of glass, horizontal plates of glass resting upon the upper edges of said vertical plates of glass, vertical plates of glass resting upon said horizontal plates of glass and placed end to end at angles relative to each other, bars of angle-iron forming connections between the meeting ends of the last-mentioned vertical plates of glass, horizontal plates of glass resting upon the upper edges of the last-mentioned vertical plates of glass, plates of glass mounted vertically upon the last-mentioned horizontal plates of glass, the upper ends of said plates being narrower than the lower ends and said plates being placed end to end at angles relative to each other and bars of angle-iron forming connections between the meeting ends of the last-mentioned plates of glass, substantially as specified.

3. In a tombstone or monument, a suitable base, vertical plates of glass resting upon said base and placed end to end at angles relative to each other, bars of angle-iron forming connections between the meeting ends of said plates of glass, horizontal plates of glass resting upon the upper edges of said vertical plates of glass, vertical plates of glass resting upon said horizontal plates of glass and placed end to end at angles relative to each other, bars of angle-iron forming connections between the meeting ends of the last-mentioned vertical plates of glass, horizontal plates of glass resting upon the upper edges of the last-mentioned vertical plates of glass, plates of glass mounted vertically upon the last-mentioned horizontal plates of glass, the upper ends of said plates being narrower than the lower ends and said plates being placed end to end at angles relative to each other, bars of angle-iron forming connections between the meeting ends of the last-mentioned plates of glass, and a suitable top piece resting upon the upper edges of the last-mentioned plates of glass, substantially as specified.

In testimony whereof we affix our signatures in presence of two witnesses.

WILLIAM ALBERT HAMMOND.
ROBERT WILLIAM TAYLOR.

Witnesses:
  JOSIE DAVID,
  ELIZABETH ✕ TAYLOR.
       her mark